United States Patent
Bina

(10) Patent No.: US 6,648,039 B1
(45) Date of Patent: Nov. 18, 2003

(54) SPRING BIASED TIRE SYSTEM

(76) Inventor: Eli Bina, 1838 Benecia Ave., Los Angeles, CA (US) 90025

( * ) Notice: Subject to any disclaimer, the term of this patent is extended or adjusted under 35 U.S.C. 154(b) by 0 days.

(21) Appl. No.: 10/287,349

(22) Filed: Nov. 4, 2002

(51) Int. Cl.$^7$ .................................................. B60C 5/00
(52) U.S. Cl. ........................ 152/156; 152/155; 152/157
(58) Field of Search ............................... 152/155, 156, 152/157, 165, 166, 5, 8, 13, 284, 289, 293, 296

(56) References Cited

U.S. PATENT DOCUMENTS

| | | | | |
|---|---|---|---|---|
| 459,015 A | * | 9/1891 | Myers | 152/272 |
| 662,332 A | * | 11/1900 | Wright | 152/255 |
| 838,838 A | * | 12/1906 | Backus | 152/332.1 |
| 1,023,516 A | * | 4/1912 | Guest | 152/6 |
| 1,198,230 A | * | 9/1916 | Horne | 152/97 |
| 1,301,467 A | * | 4/1919 | Lorenz | 152/293 |
| 1,349,339 A | * | 8/1920 | Horne | 152/263 |
| 1,401,045 A | * | 12/1921 | Clendenning | 152/156 |
| 1,440,974 A | * | 1/1923 | Dornburgh | 152/156 |
| 1,533,566 A | * | 4/1925 | Nantes | 152/156 |
| 2,083,461 A | * | 6/1937 | Loeser | 152/289 |
| 2,342,718 A | * | 2/1944 | Althen | 152/105 |
| 4,673,014 A | * | 6/1987 | Markow | 152/156 |

* cited by examiner

Primary Examiner—S. Joseph Morano
Assistant Examiner—Jason R. Bellinger
(74) Attorney, Agent, or Firm—Edward P. Dutkiewicz

(57) ABSTRACT

An elastomeric motor vehicle tire has a pair of essentially parallel side walls and with radially interior ends and radially exterior ends, and an annular road facing surface at the exterior ends and a mounting aperture there through at the interior ends and with the side walls and contacting surface, when mounted on a wheel, forming an inner recess for the containment of air. A plurality of metallic coil springs are on the road facing surface away from the side walls and apertures. A plurality of protrusions have an outer surface adapted to contact the road when in use and an inner hemispherical surface contacting an associated spring.

5 Claims, 3 Drawing Sheets

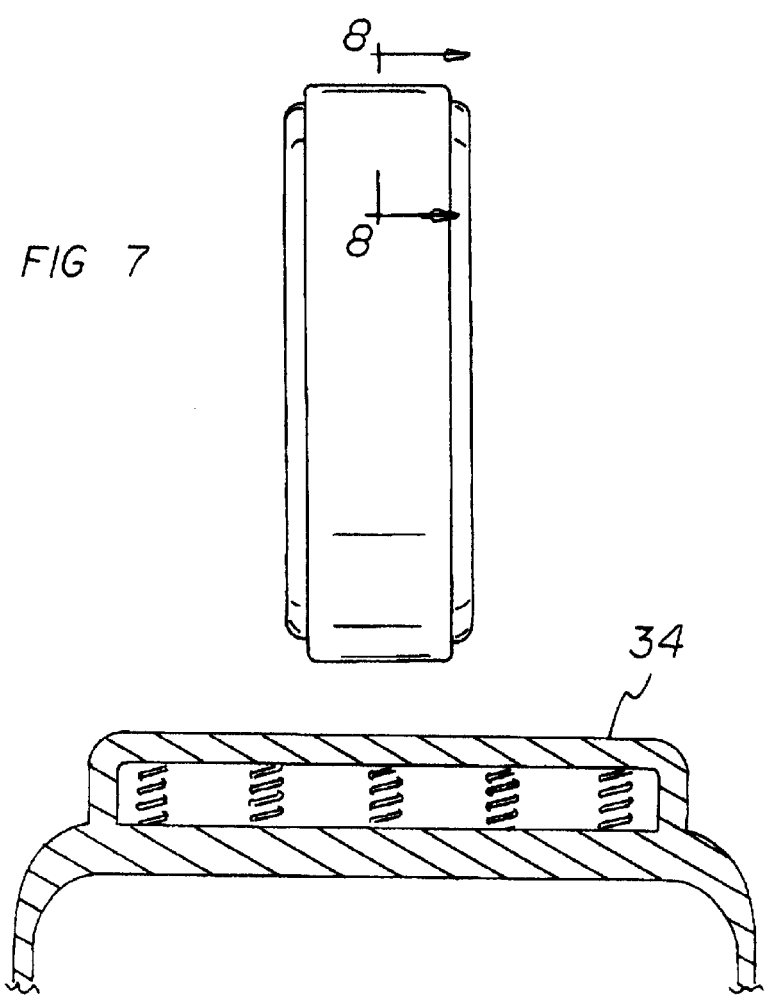
FIG 7
FIG 8
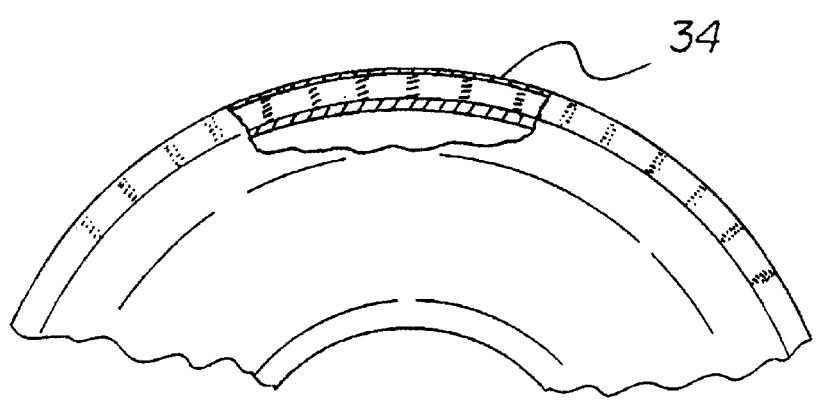
FIG 9

SPRING BIASED TIRE SYSTEM

BACKGROUND OF THE INVENTION

1. Field of the Invention

The present invention relates to a spring biased tire system and more particularly pertains to minimizing the negative effects of road hazards on tires.

2. Description of the Prior Art

The use of vehicle tires of known designs and configurations is known in the prior art. More specifically, vehicle tires of known designs and configurations previously devised and utilized for the purpose of minimizing the effects of road hazards through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,342,718 issued Feb. 29, 1944, to F. Althen discloses a resilient wheel. Also, U.S. Pat. No. 1,198,230 issued Sep. 12, 1916, discloses a spring wheel.

While these devices fulfill their respective, particular objectives and requirements, the aforementioned patents do not describe a spring biased tire system that allows minimizing the negative effects of road hazards on tires.

In this respect, the spring biased tire system according to the present invention substantially departs from the conventional concepts and designs of the prior art, and in doing so provides an apparatus primarily developed for the purpose of minimizing the negative effects of road hazards on tires.

Therefore, it can be appreciated that there exists a continuing need for a new and improved spring biased tire system which can be used for minimizing the negative effects of road hazards on tires. In this regard, the present invention substantially fulfills this need.

SUMMARY OF THE INVENTION

In view of the foregoing disadvantages inherent in the known types of vehicle tires of known designs and configurations now present in the prior art, the present invention provides an improved spring biased tire system. As such, the general purpose of the present invention, which will be described subsequently in greater detail, is to provide a new and improved spring biased tire system and method which has all the advantages of the prior art and none of the disadvantages.

To attain this, the present invention essentially comprises an elastomeric motor vehicle tire. The tire has a pair of essentially parallel side walls and radially interior ends and radially exterior ends. An annular road facing surface is at the exterior ends and a mounting aperture is provided there through at the interior ends. The side walls and road facing surface, when mounted on a wheel, form an inner recess for the containment of air. A plurality of metallic coil springs are next provided. The springs are on the road facing surface and are oriented away from the side walls and aperture. Finally, a plurality of hemispherical protrusions are provided. The protrusions are fabricated of elastomeric material. Each protrusion has an outer hemispherical surface adapted to contact the road when in use and an inner hemispherical surface contacting an associated spring. The protrusions are arrayed on the contacting surface as a plurality of axially spaced circumferential hemispheres.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved spring biased tire system which has all of the advantages of the prior art vehicle tires of known designs and configurations and none of the disadvantages.

It is another object of the present invention to provide a new and improved spring biased tire system which may be easily and efficiently manufactured and marketed.

It is further an object of the present invention to provide a new and improved spring biased tire system which is of durable and reliable constructions.

An even further object of the present invention is to provide a new and improved spring biased tire system which is susceptible of a low cost of manufacture with regard to both materials and labor, and which accordingly is then susceptible of low prices of sale to the consuming public, thereby making such spring biased tire system economically available to the buying public.

Even still another object of the present invention is to provide a spring biased tire system for minimizing the negative effects of road hazards on tires.

Lastly, it is an object of the present invention to provide a new and improved elastomeric motor vehicle tire having a pair of essentially parallel side walls and with radially interior ends and radially exterior ends, and an annular road facing surface at the exterior ends and a mounting aperture there through at the interior ends and with the side walls and contacting surface, when mounted on a wheel, forming an inner recess for the containment of air. A plurality of metallic coil springs are on the road facing surface away from the side walls and apertures. A plurality of protrusions have an outer surface adapted to contact the road when in use and an inner hemispherical surface contacting an associated spring.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a front elevational view showing a final embodiment of the invention wherein the protrusions are annular in shape.

FIG. 8 is a cross sectional view taken along line 8—8 of FIG. 7.

FIG. 9 is a side elevational view, partly in cross section, of the tire shown in FIGS. 7 and 8.

The same reference numerals refer to the same parts throughout the various Figures.

DESCRIPTION OF THE PREFERRED EMBODIMENT

Figure 1:
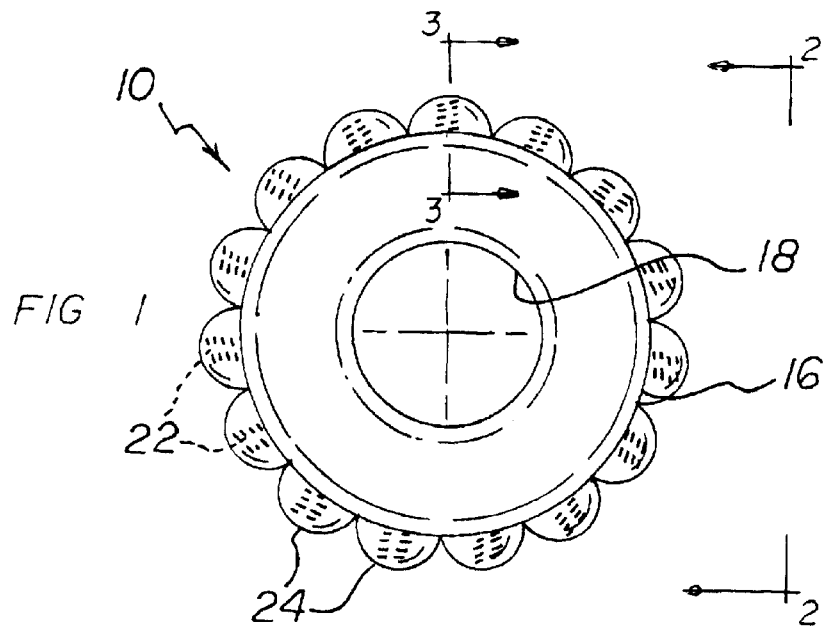
FIG. 1 is a side elevational view of the spring biased tire system constructed in accordance with the principles of the present invention.
Figure 2:
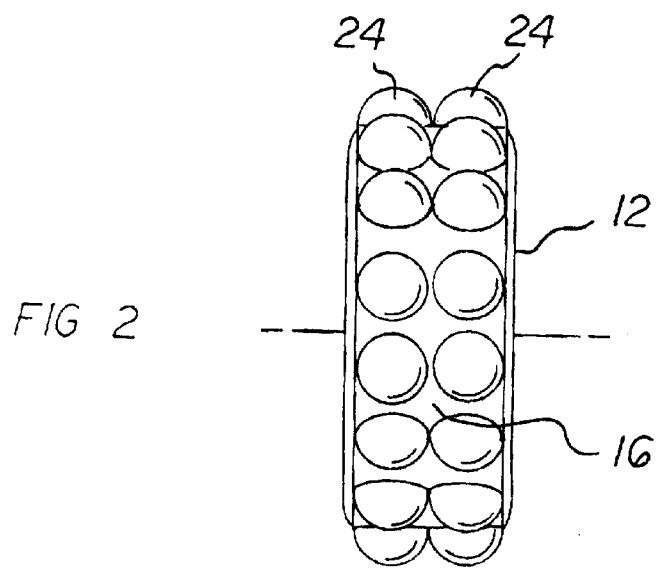
FIG. 2 is a front elevational view taken along line 2—2 of FIG. 1.
Figure 3:
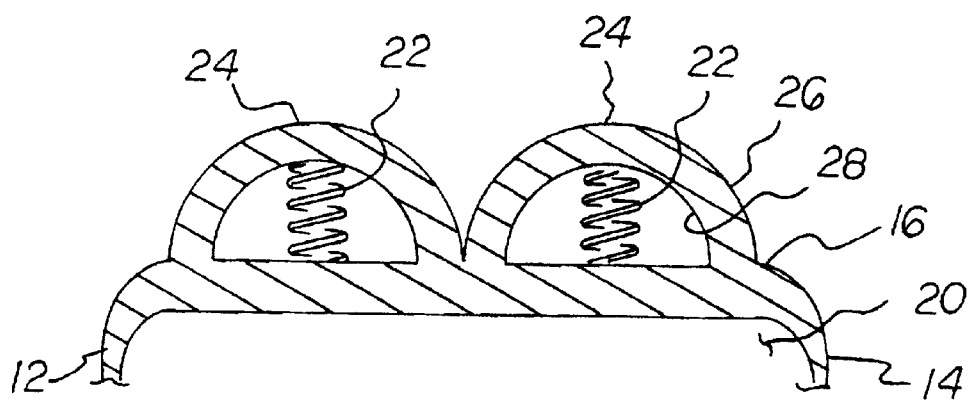
FIG. 3 is a cross sectional view taken along line 3—3 of FIG. 1.

With reference now to the drawings, and in particular to FIG. 1 thereof, the preferred embodiment of the new and improved spring biased tire system embodying the principles and concepts of the present invention and generally designated by the reference numeral 10 will be described.

The present invention, the spring biased tire system 10 is comprised of a plurality of components. Such components in their broadest context include an elastomeric motor vehicle tire, a plurality of metallic coil springs and a plurality of hemispherical protrusions. Such components are individually configured and correlated with respect to each other so as to attain the desired objective.

First provided is an elastomeric motor vehicle tire 12. The tire has a pair of essentially parallel side walls 14 and radially interior ends and radially exterior ends. An annular road facing surface 16 is at the exterior ends and a mounting aperture 18 is provided there through at the interior ends. The side walls and road facing surface, when mounted on a wheel, form an inner recess 20 for the containment of air.

A plurality of metallic coil springs 22 are next provided. The springs are on the road facing surface and are oriented away from the side walls and apertures.

Finally, a plurality of hemispherical protrusions 24 are provided. The protrusions are fabricated of elastomeric material. Each protrusion has an outer hemispherical surface 26 adapted to contact the road when in use and an inner hemispherical surface 28 contacting an associated spring. The protrusions are arrayed on the road facing surface as a plurality of axially spaced circumferential hemispheres.

Figure 4:
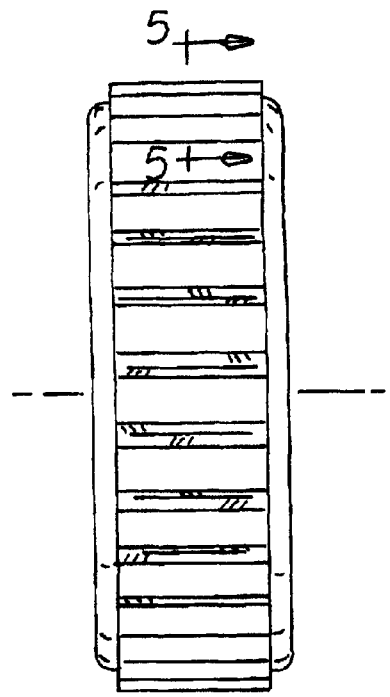
FIG. 4 is a front elevational view illustrating an alternate embodiment of the invention wherein the protrusions are generally trapezoidal in shape.
Figure 5:
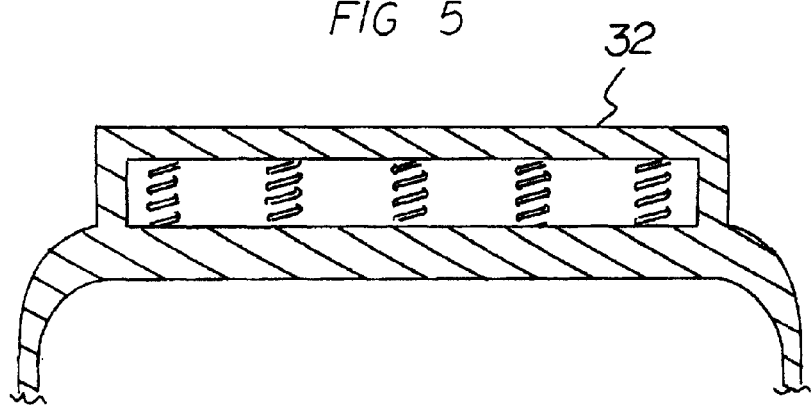
FIG. 5 is a cross sectional view taken along line 5—5 of FIG. 4.
Figure 6:
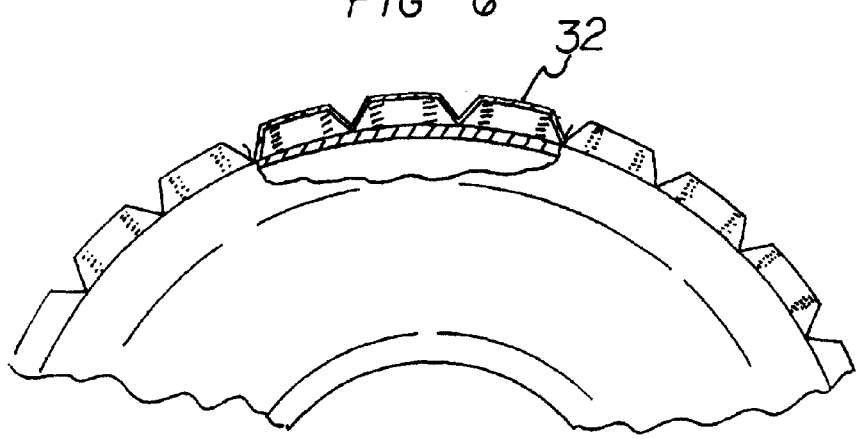
FIG. 6 is a side elevational view, partly in cross section of the tire shown in FIGS. 4 and 5.

An alternate embodiment of the invention is shown in FIGS. 4, 5, and 6. In this embodiment, the protrusions 32 are trapezoidal in shape. Each protrusion receives a plurality of axially spaced coil springs. Other components are essentially the same as in the prior embodiments.

In still another alternate embodiment, the protrusions 34 are generally annular in shape. This embodiment is illustrated in FIGS. 7, 8 and 9. There is but one large protrusion receiving a plurality of coil springs spaced both axially and circumferentially. Other components are essentially the same as in the prior embodiments.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A spring biased tire system for minimizing the negative effects of road hazards comprising, in combination:

an elastomeric motor vehicle tire having a pair of essentially parallel side walls and with radially interior ends and radially exterior ends, and an annular road facing surface at the exterior ends and a mounting aperture there through at the interior ends and with the side walls and road facing surface, when mounted on a wheel, forming an inner recess for the containment of air;

a plurality of metallic coil springs on the road facing surface, the springs being radially and axially spaced from the side walls and aperture; the springs extending radially outwards from the road facing surface; and a plurality of hemispherical protrusions fabricated of elastomeric material, each protrusion having an outer hemispherical surface adapted to contact the road when in use and an inner hemispherical surface contacting an associated spring, the protrusions being arrayed on the road facing surface as a plurality of axially spaced circumferential hemispheres.

2. A spring biased tire system comprising:

an elastomeric motor vehicle tire having a pair of essentially parallel side walls and with radially interior ends and radially exterior ends, and an annular road facing surface at the exterior ends and a mounting aperture there through at the interior ends and with the side walls and road facing surface, when mounted on a wheel, forming an inner recess for the containment of air;

a plurality of metallic coil springs on the road facing surface, the springs being radially and axially spaced from the side walls and aperture, the springs extending radially outwards from the road engaging surface; and a plurality of protrusions having an outer surface adapted to contact the road when in use and an inner hemispherical surface contacting an associated spring.

3. The system as set forth in claim 2 wherein the protrusions are hemispherical in shape.

4. The system as set forth in claim 2 wherein the protrusions are generally trapezoidal in shape.

5. The system as set forth in claim 2 wherein the protrusions are annular in shape.

* * * * *